United States Patent [15] 3,666,665
Chapman et al. [45] May 30, 1972

[54] COMPOSITION OF FERROELECTRIC MATTER

[72] Inventors: Daniel W. Chapman, San Jose; John D. Michaelsen, Los Gatos; Frederick J. Stryker, San Jose, all of Calif.

[73] Assignee: International Business Machine Corporation, Armonk, N.Y.

[22] Filed: Dec. 14, 1970

[21] Appl. No.: 98,088

Related U.S. Application Data

[63] Continuation-in-part of Ser. No. 769,757, Oct. 22, 1968, abandoned.

[52] U.S. Cl. ..........................252/62.9, 252/62.57, 106/39 R
[51] Int. Cl. .................C04b 35/48, C04b 35/50, G11b 9/02
[58] Field of Search .............252/62.56, 62.57, 62.59, 62.63, 252/62.9; 106/39

[56] References Cited

UNITED STATES PATENTS 3,518,199 6/1970 Tsubouchi et al. ...................252/62.9

OTHER PUBLICATIONS

Yudin " Chemical Abstracts," Vol. 63, P. 10835g (1965)
Tanaka et al. " Chemical Abstracts," Vol. 64, P. 11997c (1966)
Gerson et al. " Chemical Abstracts," Vol. 66, p. 59935z (1967)

*Primary Examiner*—Tobias E. Levow
*Assistant Examiner*—J. Cooper
*Attorney*—Hanifin and Jancin and Melvyn D. Silver

[57] ABSTRACT

Ferroelectric solid solutions simultaneously containing lead, iron, niobium, bismuth, zirconium, lanthanum, and oxygen are synthesized and sintered at temperatures lower than 1,000° C. Polycrystalline layers and films of such compositions are prepared by radio-frequency sputtering, electron beam evaporation, chemical spray deposition, or centrifuge deposition. Layers of such compositions only a few microns or fractions of a micron thick when on a conductive substrate are used as non-linear elements in logic and memory devices.

12 Claims, No Drawings

COMPOSITION OF FERROELECTRIC MATTER

CROSS-REFERENCES

This application is a continuation-in-part of application, Ser. No. 769,757, "Composition of Ferroelectric Matter and Polycrystalline Films and Layers Thereof," filed Oct. 22, 1968 now abandoned, and assigned to the same assignee as the assignee of this invention.

U.S. Pat. No. 3,148,354 to R. M. Schaffert patented Sept. 8, 1964 of common assignee for multilayer memory devices.

U.S. Pat. No. 3,212,929 l to Pliskin, et al. for a centrifuge deposition technique.

BACKGROUND OF THE INVENTION

The invention relates to novel ferroelectric compositions and to thin, polycrystalline ferroelectric layers made from these compositions for use as non-linear elements in logic, memory, amplifier and display devices.

To optimize information density and switching times, and to reduce drive voltage requirement, the material should, ideally, be in the form of a thin layer or film. Also, the material should be polycrystalline to reduce domain size and possible creep of recorded bits. Furthermore, it is important that the material should maintain adequately consistent switching properties for many switching cycles.

Unfortunately, most ferroelectric materials have higher coercivity and poorer hysteresis loop squareness in polycrystalline form than in single crystal form; also, for most ferroelectric compositions, the hysteresis loop squareness tends to become poorer and the coercivity tends to increase when sample thickness is reduced to below several mils. The switching properties of most ferroelectrics also deteriorate severely with repeated switching.

As is known by those skilled in the art, these problems have, to some extent, been solved by the development of certain niobium-doped $Pb(Zr, Sn, Ti)O_3$ ceramics for layers several mils thick. However, the preparation of these ceramics require reaction temperatures well over 1,000° C. to form the solid solutions, giving rise to substrate deformation and oxidation or corrosion and film cracking when formed in films or thin layers on conductive substrates.

Also, as is known to those skilled in the art, solid solutions of $Pb\,Fe_{1/2}Nb_{1/2}O_3$ and $BiFeO_3$ can be formed at much lower temperatures (≅900° C.) and these solid solutions at the morphotropic phase boundary near the 40/60 ratio, respectively, have quite non-linear dielectric properties. While films prepared of this material near the 40/60 ratio have very square hysteresis loops ($P_r/P_s$ = ratio of remanent polarization to spontaneous polarization ≅1.0), they are too conductive i.e., electrical resistivity ≅ $10^7$ ohm-cm), and have high coercivity (greater than about 35 kv/cm.).

SUMMARY OF THE INVENTION

It is therefore an object of our invention to provide a thin layer of film of novel ferroelectric materials having Curie temperature in excess of 90° C., reasonably square hysteresis loops, exhibiting relatively little or no switching fatigue and having a reasonably low coercive force.

It is another object of out invention to provide materials having properties which enable the ferroelectric film to be prepared at relatively low processing temperatures, e.g. about 950° C. or less.

These objects are achieved by new compositions which are essentially single phase solid solutions, of a. lead ferroniobate, bismuth ferrate, lead zirconate, and lanthanum ferrate (i.e., $PbFe_{1/2}Nb_{1/2}O_3$-$BiFeO_3$-$PbZrO_3$-$LaFeO_3$), or b. lead ferroniobate, bismuth ferrate, and lead zirconate (i.e., $PbFe_{1/2}O_3$-$BiFeO_3$-$PbZrO_3$), or c. lead ferroniobate and lead zirconate (i.e., $PbFe_{1/2}Nb_{1/2}O_3$-$PbZrO_3$), or d. lead ferroniobate, lead zirconate, and lanthanum ferrate, (i.e., $PbFe_{1/2}Nb_{1/2}O_3$-$PbZrO_3$-$LaFeO_3$), or e. lead ferroniobate, bismuth ferrate, and lanthanum ferrate, (i.e., $PbFe_{1/2}Nb_{1/2}O_3$-$BiFeO_3$-$LaFeO_3$).

By essentially single phase solid solutions above, is meant that no extraneous phase is present, as indicated for example by X-ray diffraction techniques; or if present, is present in a quantity insufficient to affect the properties of the desired ferroelectric films. Ideally, the desired compositions should be all single phase solid solutions.

The new compositions may be conveniently described by the general formula:

$$Pb_{1-X-Y}Bi_XLa_YFe_{1/2(1+X+Y-Z)}Nb_{1/2(1-X-Y-Z)}Zr_ZO_3$$

wherein the subscripts are mole decimal fractions wherein $0 \leq X \leq 0.80$ $0 \leq Y \leq 0.30$ $0 \leq Z \leq 0.80$ and wherein $0.01 \leq (X+Y) \leq 0.6$ whereby $0.4 \leq Pb \leq 0.99$ $0.2 \leq (X+Y+Z) \leq 0.96$ whereby $0.02 \leq Nb \leq 0.4$ $0.15 \leq [½(1+X+Y-Z)] \leq 0.80$ whereby $0.15 \leq Fe \leq 0.80$ but not wherein 1. $X=Y=Z=0$ simultaneously, or
2. $Y=Z=0$ simultaneously, or
3. $X+Z=1$ and $Y=0$ simultaneously.

In the above, the upper limits on the values of the subscripts (i.e., $X=0.8$, $Y=0.3$, and $Z=0.8$) are selected so as to include the morphotropic phase boundaries of the solid solutions — regions which give ferroelectric characteristics. The lower values have been selected, subject to the exceptions discussed below, to permit selective exclusion of individual constituents where permissible without sacrificing the desired ferroelectric characteristics.

The first exception, where $X=Y=Z=0$ simultaneously, excludes from the compositions of the invention lead ferroniobate ($PbFe_{1/2}Nb_{1/2}O_3$). This composition — not having bismuth, lanthanum, and zirconium simultaneously — has a hysteresis loop squareness which is too poor for memory devices.

The second exception, where $Y=Z=0$ simultaneously, excludes from the compositions of the invention bismuth ferrate, lead ferroniobate ($BiFeO_3$-$PbFe_{1/2}Nb_{1/2}O_3$). This composition — not having lanthanum and zirconate simultaneously — has insufficient electrical resistivity and a coercive force which is too high for memory device applications.

The third exception, where $X+Z=1$ and $Y=0$ simultaneously, excludes from the compositions of the invention lead zirconate, bismuth ferrate ($PbZrO_3$ — $BiFeO_3$). This composition — not having niobium and lanthanum simultaneously — has a hysteresis loop squareness which is too poor for memory device applications.

The requirement that $0.01 \leq (X+Y) \leq 0.6$ defines the lead content to $0.4 \leq Pb \leq 0.99$ which has been found to be the desired working range for our compositions.

The requirement that $0.2 \leq (X+Y+Z) \leq 0.96$ defines the niobium content to $0.02 \leq Nb \leq 0.4$ which has been found to be the desired working range for our compositions.

The requirement that $0.15 \leq [½(1+X+Y-Z)] \leq 0.80$ defines the iron composition to $0.15 \leq Fe \leq 0.80$ which has been found to be the desired working range for out compositions.

Thus, iron, lead, and niobium must always be present, although the amounts may vary.

The compositions of the invention are valuable as ferroelectric materials in logic devices and in data recording apparatus such as thin film memories and in multi-layer memory devices, such as memory elements having superposed layers of photoconductive and ferroelectric material, as described in the U.S. Pat. No. 3,148,354, to R. M. Schaffert, patented Sept. 8, 1964, and of common assignee, and in ferroelectric field effect devices as described by Heyman and Heilmeier (P. M. Heyman and G. H. Heilmeier, "A Ferroelectric Field Effect Device," Proceedings IEEE, Vol. 54, No. 6, June 1966, page 842) and in display devices such as the EL/FE devices described by B. J. Lechner (Solid State Raster Scanning for Display, DDC Report No. AD464846) and in frequency multipliers (D. M. Kazarnozskii and V. P. Sidoranko, "Use of Ferroelectric in Frequency Multipliers," English Translation, Bulletin Academy of Sciences USSR, Physical Theory, Volume 21, No. 3, Page 450) and dielectric amplifiers (Solid State Magnetic and Dielectric Devices, Wiley & Sons, N. Y., 1959, Chapter 8).

The foregoing and other objects, features and advantages of the invention will be apparent from the following more particular description of preferred embodiments of the invention.

DESCRIPTION OF THE PREFERRED EMBODIMENTS

In general, the ferroelectric compositions of the invention are synthesized by firing the correspondingly appropriate mixtures of PbO, $Bi_2O_3$, $Fe_2O_3$, $Nb_2O_5$, $ZrO_2$ and $La_2O_3$ for about 3 hours at 850° to 950° C., and then sintering compacted disks or pellets of the resultant powder at 950° to 1,250° C. The second firings, or sinterings, may be done in a closed platinum boat, which also contains a few grams of $PbTiO_3$ and LiF powder mixed in approximately a 50:1 ratio by weight to provide a beneficial atmosphere, or trace amounts of LiF may be incorporated as a sintering aid.

The ferroelectric compositions of the invention, for most applications, are prepared as thin layers or films on a conductive substrate. By "thin layer or film" is meant a layer or film of about ½ micron to several mils in thickness. As deposition or other techniques (some of which are described below) are improved, those films or layers may be made even thinner than ½ micron without losing the ferroelectric properties desired. The conductive substrates, above, may be rolled foils of "noble" metals (such as gold, platinum, platinum — iridium alloys, gold - palladium alloys, etc.) or ceramics and glasses metalized with films of such noble metals.

The thin ferroelectric layers or films of the invention may be prepared by the following methods.

I. Radio-frequency sputtering usually followed by post deposition heat treatment of the film.

II. Electron beam evaporation followed by post deposition sintering of the film.

III. Chemical-spray-deposition followed by sintering of the deposited film.

IV Centrifuge-deposition followed by sintering of the deposited films.

In Method I, the films are deposited by standard r.f. sputtering techniques using a cathode made by standard ceramic-sintering techniques or by hot pressed sintering from powder of the ferroelectric composition. Films may be deposited at a variety of substrate temperatures, ranging from about 250° C. to about 700°C. The ferroelectric films of the invention are usually sputtered in an argon-oxide-oxygen atmosphere having a total pressure of about 3 to 10 microns, with the oxygen content being 5 to 10 percent. Films have also been deposited in a 100 percent oxygen atmosphere at lower total pressures. They are deposited by this technique on both rolled foil substrates and on metallized ceramics or metallized glasses. However, as the films are usually deficient in lead when they come out of the sputtering unit, the lead is restored and the films made ferroelectric by heating the films in a lead oxide atmosphere at 750° C. for about 16 hours. The appropriate atmosphere is achieved if the films are heated in a closed platinum boat measuring about 6 inches × 2 inches × 2 inches, containing a few grams of loose PbO powder in the bottom.

The proper amount of lead can sometimes be incorporated in the film during the sputtering process by using a cathode containing excess lead, or by covering parts of the cathode with lead spots or strips. Sometimes similar schemes utilizing excess bismuth are required to obtain the proper amount of bismuth in the film.

In Method II, electron beam evaporation, a compressed pellet of ferroelectric powder is placed in a vacuum system and bombarded with a high intensity electron beam which causes flash evaporation of the powder, which powder deposits on the substrate. The substrate is usually heated to several hundred degrees centigrade. To obtain the stoichiometric quantities of the constituents in the deposited film, it is usually necessary to incorporate excess amounts of the low vapor pressure constituents such as iron, niobium, and zirconium in the source pellet. The deposited films are then sintered at 950° C. in a lead oxide atmosphere for 16 hours.

In Method III, chemical spray deposition, a powder of the desired ferroelectric material is prepared by the usual ceramic technique. The fired powder is then pressed into pellets up to one-half inch in diameter and given an extended firing at the optimum temperature for the particular ferroelectric material. The resintered pellets are then pulverized and the resultant powder dissolved or allowed to digest slowly in concentrated mineral acids such as hydrochloric acid or nitric acid or mixtures of same. The mixture is allowed to digest for one to four hours, depending on the solubility of the material. At the end of the digestion period, the solution or suspension of the ferroelectric material is treated with sufficient glacial acetic acid to convert it to the mixed acetate. The solution of mixed acetates is then diluted to the desired molarity for spray coating. The clear solution of ferroelectric material is gravity fed to the fluid input of a model H-1 Paasche air brush where it is mixed with air at a line pressure of 15 to 30 psi. The fluid line is metered for a flow of 0.15 to 0.75 ml per minute with a Predictability Flowmeter. The spray fan is directed towards the substrate at an angle of 40° to 60°. The substrate is heated from below by means of a hot plate or bunsen burner. It is desirable to rotate the substrate within the spray fan to assure even coverage. The substrate is kept at a temperature of 200° to 700° F. Higher temperatures do not appear to be desirable. The film is allowed to build up to the desired thickness of semi-green material, or one or more coats may be applied with the proper sintering of each coat in between as the coating thickness is built up. Metals or materials which can withstand the sintering cycle may be used as a substrate. Most substrates require a pretreatment in order for the ferroelectric material to deposit evenly. This may be accomplished by depositing a thin layer of tin or tin oxide, iron oxide, manganese oxides, or by a microsurface roughening using a very fine grit. The final film is usually sintered overnight at 900° C. in a platinum boat which contains chemicals which slowly give off PbO to compensate for losses of PbO during the sintering. Shorter cycles at 950° C. may be used. Some contaminates such as chlorine are usually found in films made by this technique.

In Method IV, centrifuge deposition, a powder of the desired ferroelectric material is prepared by the usual ceramic techniques. This powder is then pulverized into colloidal sized particles, typically by ball milling a methanol suspension of the powder. The resultant suspension is then separated into different cuts containing particles of different sized ranges or solid content. Finally, one of the low concentration cuts containing fine particles is used to coat a conductive substrate. As described by Pliskin, et al., in U.S. Pat. No. 3,212,929, the substrate is coated by placing it in the bottom of the container holding a fine particle suspension in a centrifuge. A drop or two of Duponol L–144–WDG (Trademark, E. I. duPont de Nemours & Co.) surface active agent having been added to the suspension, the centrifuge is then operated at the appropriate speed and for the appropriate time to deposit a layer of particles, about one and one-half to two times as thick as the final desired film, onto the substrate. The solution is then poured off, the coated substrate removed, dried, and inserted into an oven where it is heated, usually in an appropriate atmosphere, until the layer of particles is sintered into a continuous film. The resultant films are typically about one-half to two-thirds as thick as the unsintered (green) layers. Occasionally, it is necessary or helpful to co-deposit a material such as lead oxide with the ferroelectric powder during the centrifuging process. In the case of ferroelectrics containing lead, it is usually necessary to put a compound containing lead in the sintering boat along with the film to minimize evaporative loss of PbO from the film during the sintering. In sintered films prepared in the above manner, there are some obvious pin holes and cracks through to the substrate. Such problems can be reduced significantly by using two or more coats to build up to the final desired thickness. An example of this is the Trichlor Technique described in Pliskin and Conrad, "-Techniques for Obtaining Uniform Thin Glass Films on Substrates", Electrochemical Technology, Vol. 2, No. 7–8, July–August, 1964, page 196. In the Trichlor Technique, the substrate to be coated is first covered by a volume of trichloroethylene in the centrifuging vial. The trichloroethylene separates the substrate from the methanol containing the ferroelectric particles and tends to prevent movement of the deposited particles when the liquids are poured out of the vial after the centrifuging. With the ferroelectric compositions of the invention, it is usually necessary or desirable to add a drop or two of Duponol to the trichloroethylene to obtain good results. By the Trichlor Technique, it is possible to put down a very thin green film, partially sinter it, coat it with a second green film, and sinter the combination to completion. Obviously, more than two coats may be used to build up to the final desired thickness.

In making the films of the invention by any of the above methods, a problem is the preparation of a conductive substrate having a continuous, smooth finish which will maintain this finish and its electrical conductivity after undergoing the ferroelectric films post deposition heating cycle, which can be as high in temperature as 1,000° C. It is possible to prepare substrate electrodes by coating flat pieces of polished, high density alumina ($AL_2O_3$) with commercially available platinum paste, such as duPont No. 7919. Typically, six to eight coats of such paste are required. Each coat is silk screened onto the alumina, heated to a temperature of 300° F. to 400° F. and then fired at a temperature between 1,000° C and 1,350° C. Each coat is polished after the high temperature firing by conventional techniques. This manner of preparation is necessary due to the slightly porous nature of the alumina; the first few coats of platinum almost entirely submerge into the pores and crevices of the alumina substrate.

Significantly better hysteresis loops and reproducibility are obtained from samples prepared on gold or platinum foil substrates, and on appropriate metallized glass substrates; gold yields films with squarer hysteresis loops than platinum.

Having described the general process by which films of the compositions of the invention may be prepared an example of the preferred composition and other compositions will next be described.

Example 1: $Pb_{0.92}Bi_{0.07}La_{0.01}Fe_{0.405}Nb_{0.325}Zr_{0.27}O_3$

The apparent optimum composition of the invention occurs when $X=0.07$, $Y=0.01$, and $Z=0.27$ in the general formula. This composition essentially is a solid solution of lead ferroniobate (65 mole percent), bismuth ferrate (7 mole percent), lanthanum ferrate (1 mole percent), and lead zirconate (27 mole percent).

The composition of this example is synthesized by firing the correspondingly appropriate mixture of PbO, $Bi_2O_3$, $Fe_2O_3$, $Nb_2O_5$, $ZrO_2$ and $La_2O_3$ for three hours at 875° C., and then sintering compacted disks or pellets of the resultant powder at 950° C. for 16 hours. The second firing, or sintering, is done in a closed platinum boat, which also contains a few grams of $PbTiO_3$ and LiF powder mixed in a 50:1 ratio by weight to provide a beneficial atmosphere. This second firing in compacted form is essential to obtain completely reacted material. Higher firing temperatures may be used for shorter time periods, if desirable. For example, the initial calcining and second sintering may be performed in a few hours time at temperatures near 1,200° C.

Disks and pellets prepared in the above manner are true single phase solid solutions, and several time-temperature cycling tests failed to cause segregation of any components. X-ray analysis indicates a pseudo-cubic (or rhombohedral structure with extremely small distortion from cubic); $a_o \cong 4.051$ A. On this basis, calculated theoretical density is approximately 8.29. The thin films of this composition whose properties will be described have this same structure. The Curie temperature of the material of this example is about 150° C.; and its electrical resistivity is approximately $10^{11}$ ohm-centimeters. The small signal dielectric constant is approximately 1,000 at room temperature.

Thin films of the composition of this example may be prepared on a conductive substrate as heretofore described. Post deposition heat treatment in a PbO atmosphere at temperature between 750° C. and 950° C. is usually required to optimize film properties. The resulting film is highly resistant to pulse decay type of switching fatigue. For example, in pulse switching fatigue tests, the films have survived more than $10^{11}$ polarization reversals.

Polycrystalline films of this composition as thin as about one-half micron have square hysteresis loops, relatively low coercive force, and submicrosecond switching speeds. The hysteresis properties are summarized in Table 1, following Example 12.

Example 2: $Pb_{0.99}La_{0.01}Fe_{0.335}Nb_{0.325}Zr_{0.34}O_3$

In this example, $X=0$, $Y=0.01$, and $Z=0.34$ in the general formula. The composition of this example is synthesized by firing the correspondingly appropriate mixture of PbO, $Fe_2O_3$, $Nb_2O_5$, $ZrO_2$, and $La_2O_3$ for three hours at 875° C. The test film was fired for one-half hour at 950° C. in a PbO atmosphere. Test results (see Table 1) could probably be improved by optimization of the firing cycles.

Example 3: $Pb_{0.92}Bi_{0.08}Fe_{0.405}Nb_{0.325}Zr_{0.27}O_3$

In this example, $X=0.08$, $Y=0$, and $Z=0.27$ in the general formula. The composition of this example is synthesized by firing the correspondingly appropriate mixture of PbO, $Bi_2O_3$, $Fe_2O_3$, $Nb_2O_5$ and $ZrO_2$ for three hours at 875° C. The test film was fired for one-half hour at 950° C. in a PbO atmosphere. Test results (see Table 1) could probably be improved by optimization of the firing cycles.

Example 4: $Pb_{0.91}Bi_{0.08}La_{0.01}Fe_{0.89}Nb_{0.30}Zr_{0.31}O_3$

In this example $X = 0.08$, $Y = 0.01$, and $Z = 0.31$ in the general formula. The composition of this example is synthesized by firing the correspondingly appropriate mixture of PbO, $Bi_2O_3$, $Fe_2O_3$, $Nb_2O_5$, $ZrO_2$ and $La_2O_3$ for three hours at 875° C. The test film was fired for one-half hour at 950° C. in a PbO atmosphere. Test results (see Table 1) could probably be improved by optimization of the firing cycles.

Example 5: $Pb_{0.90}Bi_{0.09}La_{0.01}Fe_{0.39}Nb_{0.275}Zr_{0.35}O_3$

In this example, $X=0.09$, $Y=0.01$, and $Z=0.35$. The composition of this example is synthesized by firing the correspondingly appropriate mixture of PbO, $Bi_2O_3$, $Fe_2O_3$, $Nb_2O_5$, $ZrO_2$, and $La_2O_3$ for three hours at 875° C. The test film was fired for one-half hour at 950° C. in a $PbF_2$ atmosphere plus five minutes at 1,050° C. in air to remove the excess $PbF_2$. Test results (see Table 1) could probably be improved by optimization of the firing cycles.

Example 6: $Pb_{0.9}Bi_{0.1}Fe_{0.375}Nb_{0.275}Zr_{0.35}O_3$

In this example, $X=0.1$, $Y=0$, and $Z=0.35$ in the general formula. The composition of this example is synthesized by firing the correspondingly appropriate mixture of PbO, $Bi_2O_3$, $Fe_2O_3$, $Nb_2O_5$, and $ZrO_2$ for three hours at 875° C. The test film was fired for 20 minutes at 950° C. in a PbO atmosphere. Test results (see Table 1) could probably be improved by optimization of the firing cycles.

Example 7: $Pb_{0.82}Bi_{0.18}Fe_{0.23}Nb_{.05}Zr_{0.72}O_3$

In this example, $X=0.18$, $Y=0$, and $Z=0.72$ in the general formula. The composition of this example is synthesized by firing the correspondingly appropriate mixture of PbO, $Bi_2O_3$, $Fe_2O_3$, $Nb_2O_5$, and $ZrO_2$ for three hours at 875° C. The test film was fired for one-half hour at 900° C. in a PbO atmosphere plus an additional 15 minutes at 1,000° C. also in a PbO atmosphere. Test results (see Table 1) could probably be improved by optimization of the firing cycles.

Example 8: $Pb_{0.4}Bi_{0.3}La_{0.3}Fe_{0.8}Nb_{0.2}O_3$

In this example, $X=0.3$, $Y=0.3$, and $Z=0$ in the general formula. The composition of this example is synthesized by firing the correspondingly appropriate mixture of PbO, $Bi_2O_3$, $Nb_2O_5$, and $La_2O_3$ for three hours at 850° C. The test film was fired for sixteen hours at 780° C. in a PbO atmosphere plus an additional two hours at 850° C. also in a PbO atmosphere. Test results (see Table 1) could probably be improved by optimization of the firing cycles.

Example 9: $Pb_{0\ .65}Bi_{0\ .35}Fe_{0\ .6}Nb_{0\ .25}Zr_{0\ .15}O_3$

In this composition, $X = 0.35$, $Y = 0$, and $Z = 0.15$ in the general formula. The composition of this example is synthesized by firing the correspondingly appropriate mixture of PbO, $Bi_2O_3$, $Fe_2O_3$, $Nb_2O_5$ and $ZrO_2$ for three hours at 875° C. The test film was fired for one-half hour at 900° C. in a PbO atmosphere. Test results (see Table 1) could probably be improved by optimization of the firing cycles.

Example 10: $Pb_{0\ .6}Bi_{0\ .4}Fe_{0\ .5}Nb_{0\ .1}Zr_{0\ .4}O_3$

In this example, $X=0.4$, $Y=0$, and $Z=0.4$ in the general formula. The composition of this example is synthesized by firing the correspondingly appropriate mixture of PbO, $Bi_2O_3$, $Fe_2O_3$, $Nb_2O_5$ and $ZrO_2$ for 3 hours at 875° C. The test film was fired for one-half hour at 900° C. in a PbO atmosphere plus an additional fifteen minutes at 1,000° C., also in a PbO atmosphere. Test results (see Table 1) could probably be improved by optimization of the firing cycles.

Example 11: $Pb_{0\ .51}Bi_{0\ .49}Fe_{0\ .64}Nb_{0\ .15}Zr_{0\ .21}O_3$

In this example, $X=0.49$, $Y=0$, and $Z=0.21$ in the general formula. The composition of this example is synthesized by firing the correspondingly appropriate mixture of PbO, $Bi_2O_3$, $Fe_2O_3$, $Nb_2O_5$ and $ZrO_2$ for 3 hours at 875° C. The test film was fired for three-quarters of an hour at 900° C. in a PbO atmosphere. Test results (see Table 1) could probably be improved by optimization of the firing cycles.

Example 12: $Pb_{0\ .4}Bi_{0\ .588}La_{0\ .012}Fe_{0\ .8}Nb_{0\ .2}O_3$

In this example, $X = 0.588$, $Y = 0.012$, and $Z = 0$ in the general formula. The composition of this example is synthesized by firing the correspondingly appropriate mixture of PbO, $Bi_2O_3$, $Fe_2O_3$, $Nb_2O_5$ and $La_2O_3$ for 3 hours at 850° C. The test film was fired for 3 hours at 850° C. in a PbO atmosphere. Test results (see Table 1) could probably be improved by optimization of the firing cycles.

To evaluate the above films, gold dot electrodes (approximately 20 mils in diameter) are evaporated onto the top of the films. Then the gold dot electrode and the substrate electrode are connected to the appropriate terminals of electrical test circuitry. Contact to the gold dot electrode may be made with a drop of Wetalloy (Trademark: Victor King Lab., Los Altos, Calif.). Frequently the gold electrodes shorted through the film to the conductive substrate, and then the contact was made directly to the top surface of the film with the drop of Wetalloy. Thus some error may exist in the values in the table below for spontaneous polarization due to uncertainties in electrode area. The hysteresis loop parameters listed above and in the table below have the usual definitions known to those skilled in the art, and the data was taken with a bridge circuit nearly identical to that of Diament et al ("Bridge for Accurate Measurement of Ferroelectric Hysteresis," The Review Of Scientific Instruments, Vol. 28, No. 1, Jan. 1957, p. 30).

The following table summarizes the test results for the various films of Examples 1–12, wherein $X$, $Y$, and $Z$ are the subscript values in the general formula of the invention, $P_s$ is the spontaneous polarization in $\mu c/cm^2$, $P_r$ is the remanent polarization in $\mu c/cm^2$, $E_c$ is the coercive force in kv/cm, and the film thickness is in microns. Some test results on bulk samples of the compositions where better control over electrode area could be achieved indicate the true spontaneous polarization values are probably somewhat larger than those listed below.

TEST RESULTS ON FILMS PREPARED FROM EXAMPLE COMPOSITIONS

| Example | X | Y | Z | $P_s$ | at 1 kHz $P_r/P_s$ | $E_c$ | thickness (microns) |
|---|---|---|---|---|---|---|---|
| 1 | .07 | .01 | .27 | 10 | −.8 | −10 | 5 |
| 2 | 0 | .01 | .34 | 15 | .7 | 30 | 5 |
| 3 | .08 | 0 | .27 | 7 | .67 | 30 | 4 |
| 4 | .08 | .01 | .31 | 8 | .7 | 50 | 4 |
| 5 | .09 | .01 | .35 | 10 | .7 | 15 | 7 |
| 6 | .1 | 0 | .35 | 15 | .7 | 40 | 5 |
| 7 | .18 | 0 | .72 | 10 | .6 | 40 | 5 |
| 8 | .30 | .3 | 0 | −.2 | .8 | 80 | 7 |
| 9 | .35 | 0 | .15 | 8 | .5 | 30 | 7 |
| 10 | .4 | 0 | .4 | 2.2 | .74 | 60 | 5 |
| 11 | .49 | 0 | .21 | 6 | .5 | 30 | 6 |
| 12 | .588 | .012 | 0 | 12 | .8 | 100 | 3 |

The specific ferroelectric compositions of matter consisting of solid solution of lead ferroniobate ($PbFe_{1/2}Nb_{1/2}O_3$), lead zirconate ($PbZrO_3$), bismuth ferrate ($BiFeO_3$), and lanthanum ferrate ($LaFeO_3$) expressed as a ratio with the total adding up to 100 percent are as follows:

| $\%PbFe_{1/2}Nb_{1/2}O_3$ | $\%PbZrO_3$ | $\%BiFeO_3$ | $\%LaFeO_3$ |
|---|---|---|---|
| 45 | 47 | 7 | 1 |
| 50 | 42 | 7 | 1 |
| 52.5 | 39.5 | 7 | 1 |
| 55 | 37 | 7 | 1 |
| 57.5 | 34.5 | 7 | 1 |
| 60 | 32 | 7 | 1 |
| 65 | 27 | 7 | 1 |

The capacitance and the resonant frequency of a poled sample of the three extremes of the above compositions were measured to determine aging characteristics of these materials. The samples were poled at room temperature at 40 kV/cm for 4 minutes. Measurements were made at 23 hours and at 7 days. Results are listed below:

| | 23 hours | | | 7 days | | | Aging rate percent per decade | |
|---|---|---|---|---|---|---|---|---|
| Composition | C, pf. | tan δ | $f_r$, Hz. | C, pf. | tan δ | $f_r$, Hz. | C | $f_r$ |
| 45/47/7/1 | 778.7 | .017 | 132,407 | 773.3 | .017 | 132,478 | −.37 | +.03 |
| 55/37/7/1 | 1,041 | .019 | 134,850 | 1,057 | .019 | 134,820 | +.83 | −.12 |
| 65/27/7/1 | 1,729 | .020 | 130,548 | 1,710 | .021 | 130,342 | −.59 | −.085 |

Capacitance aging is usually negative and frequency aging is usually positive. The frequency aging of the four samples showing resonant effects is very small compared to other ferroelectric ceramics; the anomalous direction of the second and third compositions must be evaluated in light of the small magnitude. Capacitance aging for the first three compositions is similarly very low, especially compared to other ferroelectric compositions. For example, existing compositions used commercially for wave filters have capacitance aging of −1 percent per decade and frequency aging of +0.1 percent per decade. At least one commercial ferroelectric transducer composition shows anamolous aging, and it too is a very stable material. For memory applications the P-E hysteresis loop should be reasonably square and loop degradation should be minimal over many cycles, as discussed previously. It has been found that degradation is related to the amount of mechanical deformation that occurs during switching. A parameter that has been used as a measure of this deformation is the "strain hump." This is defined as the non-piezoelectric strain the material is subjected to during switching. This is measured by extrapolating from the linear portion of the S-E loop through the origin to the coercive field of opposite sign, measuring the change in strain from that point to the strain peak. The magnitude of these "strain humps" are listed below for the above three compositions, and for a composition not containing lanthanum.

| Composition | Strain Hump, ppm |
|---|---|
| 45/47/7/1 | 280 |
| 55/37/7/1 | 336 |
| 66/27/7/1 | 330 |
| 65/27/8/0 | 312 |

"Strain hump" measurements are considered accurate only to about 25 percent. On this basis all of our compositions have "-strain humps" of about 300 ppm;. These "strain humps" are small compared to those of nearly all other ferroelectrics tested which are poor in switching endurance.

While the invention has been particularly described with reference to preferred embodiments thereof, compositions other than those cited above have been studied.

What is claimed is:

1. The ferroelectric composition of matter consisting essentially of a solid solution having the formula $$Pb_{0.92}Bi_{0.07}La_{0.01}Fe_{.405}Nb_{0.325}Zr_{0.27}O_3$$

where the subscripts represent mole decimal fractions.

2. The ferroelectric composition of matter consisting essentially of a solid solution having the formula $$Pb_{0.99}La_{0.01}Fe_{0.335}Nb_{0.325}Zr_{0.34}O_3$$

where the subscripts represent mole decimal fractions.

3. The ferroelectric composition of matter consisting essentially of a solid solution having the formula $$Pb_{0.92}Bi_{0.08}Fe_{0.405}Nb_{0.325}Zr_{0.27}O_3$$

where the subscripts represent mole decimal fractions.

4. The ferroelectric composition of matter consisting essentially of a solid solution having the formula $$Pb_{0.91}Bi_{0.08}La_{0.01}Fe_{0.39}Nb_{0.3}Zr_{0.31}O_3$$

where the subscripts represent mole decimal fractions.

5. The ferroelectric composition of matter consisting essentially of a solid solution having the formula $$Pb_{0.90}Bi_{0.09}La_{0.01}Fe_{0.375}Nb_{0.275}Zr_{0.35}O_3$$

where the subscripts represent mole decimal fractions.

6. The ferroelectric composition of matter consisting essentially of a solid solution having the formula $$Pb_{0.9}Bi_{0.1}Fe_{0.375}Nb_{0.275}Zr_{0.35}O_3$$

where the subscripts represent mole decimal fractions.

7. The ferroelectric composition of matter consisting essentially of a solid solution having the formula $$Pb_{0.82}Bi_{0.18}Fe_{0.23}Nb_{0.05}Zr_{0.72}O_3$$

where the subscripts represent mole decimal fractions.

8. The ferroelectric composition of matter consisting essentially of a solid solution having the formula $$Pb_{0.4}Bi_{0.3}La_{0.3}Fe_{0.8}Nb_{0.2}O_3$$

where the subscripts represent mole decimal fractions.

9. The ferroelectric composition of matter consisting essentially of a solid solution having the formula $$Pb_{0.65}Bi_{0.35}Fe_{0.6}Nb_{0.25}Zr_{0.15}O_3$$

where the subscripts represent mole decimal fractions.

10. The ferroelectric composition of matter consisting essentially of a solid solution having the formula $$Pb_{0.6}Bi_{0.4}Fe_{0.5}Nb_{0.1}Zr_{0.4}O_3$$

where the subscripts represent mole decimal fractions.

11. The ferroelectric composition of matter consisting essentially of a solid solution having the formula $$Pb_{0.51}Bi_{0.49}Fe_{0.64}Nb_{0.15}Zr_{0.21}O_3$$

where the subscripts represent mole decimal fractions.

12. The ferroelectric composition of matter consisting essentially of a solid solution having the formula $$Pb_{0.4}Bi_{0.588}La_{0.012}Fe_{0.8}Nb_{0.2}O_3$$

wherein the subscripts represent mole decimal fractions.

* * * * *